United States Patent [19]

Cooney

[11] Patent Number: 4,620,110

[45] Date of Patent: Oct. 28, 1986

[54] COMPACT POWER SUPPLY MODULE AND CORD

[75] Inventor: Robert W. Cooney, Marcy, N.Y.

[73] Assignee: General Electric Company, Portsmouth, Va.

[21] Appl. No.: 755,115

[22] Filed: Jul. 15, 1985

[51] Int. Cl.⁴ .............................................. H02J 7/00
[52] U.S. Cl. ...................................... 307/48; 307/150; 307/85; 307/154
[58] Field of Search ..................... 307/48, 150, 80, 85, 307/154

[56] References Cited

U.S. PATENT DOCUMENTS

| | | | |
|---|---|---|---|
| 2,856,517 | 10/1958 | Steglich | 250/14 |
| 3,077,563 | 2/1963 | Combs et al. | 307/150 |
| 4,002,892 | 1/1977 | Zielinski | 307/154 X |
| 4,084,123 | 4/1978 | Lineback et al. | 320/2 |
| 4,225,814 | 9/1980 | Gantz et al. | 320/2 |

Primary Examiner—William M. Shoop, Jr.
Assistant Examiner—Alfred Hoyte

[57] ABSTRACT

A product such as a portable radio adapted for operation from either an internal battery source or an external source of relatively high voltage alternating current electric power is provided with a removable power module containing all of the high voltage components required for operation from the alternating current source. The removable power module is connected to the product by a low bulk, low voltage electrical connector through a recess in the product housing, the recess being sized to receive both the power module and the electrical connector when battery operation is desired. Because of the low bulk of the electrical connector, the size of the recess may be minimized.

14 Claims, 8 Drawing Figures

COMPACT POWER SUPPLY MODULE AND CORD

BACKGROUND OF THE INVENTION

1. Field of the Invention

This invention relates to an AC/DC power supply means adapted for use with portable products such as radios and tape recorders and, more particularly, to a power supply means requiring substantially reduced storage space within the product.

2. Description of the Prior Art

In consumer audio electronics products such as portable radios and tape recorders, it is often desirable to provide switchable power supply means for operating the product at the option of the user from either batteries contained within the product or an external source of 120 volt alternating current electric power. Typically, AC electric power is supplied by means of an electric power cord having terminal means on each end for coupling the external power outlet to the audio product. The coupling to the audio product is provided to permit removal of the external cord when it is desired to operate the product from the internal battery power source. In order to minimize the possibility of loss of the cord, it is typical to provide storage means within the product for receiving the cord when operation on battery power is desired. The various power supply components, including the batteries, the AC line cord, and the electrical apparatus for converting relatively high voltage alternating current supplied through the line cord to relatively low voltage direct current, require considerable space within the audio products. In some smaller products, the space required for the various power components can amount to as much as one-half of the total volume of the product.

In portable audio products, it is highly desirable to minimize the total size of the product, consistent with retention of desired product features and performance quality. To achieve this goal, storage space for the line cord is eliminated in some products. This approach is not altogether satisfactory in that it often results in either loss of the line cord or unavailability of the line cord when operation from an external power source is desired. Another approach to product size reduction is to combine the line cord and the power conversion apparatus into solely external means for supplying low voltage direct current to the product. Again, there is a risk that the external components will be either lost or otherwise unavailable when operation from an external power source is desired.

SUMMARY OF THE INVENTION

It is a primary object of this invention to provide in a portable audio product or similar product improved power supply means for supplying energy from either internal or external sources of electric power.

Another object of the invention is to provide AC/DC power supply means that may be totally received within the audio product in substantially minimum space.

Yet another object of the invention is to provide an AC/DC power supply means which will be always available when needed for product operation.

Briefly stated, in carrying out the invention in one form, a product having a primary housing and an electrical load therein adapted for selective energization from first and second sources of direct current power is provided with a recess accessible from the exterior of the primary housing. The first source of direct current electric power comprises battery means received within the primary housing, and the second source comprises means for converting relatively high voltage alternating current to relatively low voltage direct current. The improvement comprising the invention includes a secondary housing containing at least all of the high voltage components of the second source including terminal means for connection to an external source of alternating current electric power. A relatively low bulk, low voltage electrical conductor interconnects the secondary housing and the product through the recess for supplying low voltage electric power to the product from the second source, the electrical conductor preferably being permanently attached to both the secondary housing and the product. The recess is configured and sized to receive both the secondary housing and the electrical conductor for storage therein when the product is not being energized by the second source, the low bulk of the electrical conductor permitting the size of the recess to be minimized. A latching means is provided for releasably securing the secondary housing and the electrical conductor within the recess.

In accordance with further aspects of the invention, the secondary housing includes external wall means adapted to form a substantial continuation of the outer surface of the primary housing when the secondary housing is secured within the recess. The second source comprises a power transformer within the secondary housing having a primary winding connected to the terminal means and a secondary winding. A rectifying means is provided within the primary housing for converting low voltage alternating current to low voltage direct current for energization. The invention further comprises switching means having a first operative state connecting at least the first source to the product and a second operative state connecting only the second source to the product. The switching means includes switch actuating means at least partially carried by the secondary housing for switching the switching means to the first operative state when the secondary housing is secured within the recess and for switching the switching means to the second position when the secondary housing is removed from the recess.

BRIEF DESCRIPTION OF THE DRAWINGS

While the novel features of the invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

Figure 1:
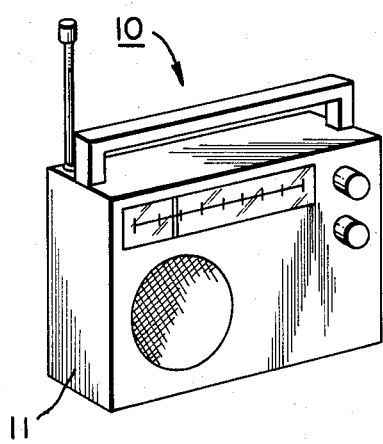
FIG. 1 is a front perspective view of a radio incorporating the invention.
Figure 2:
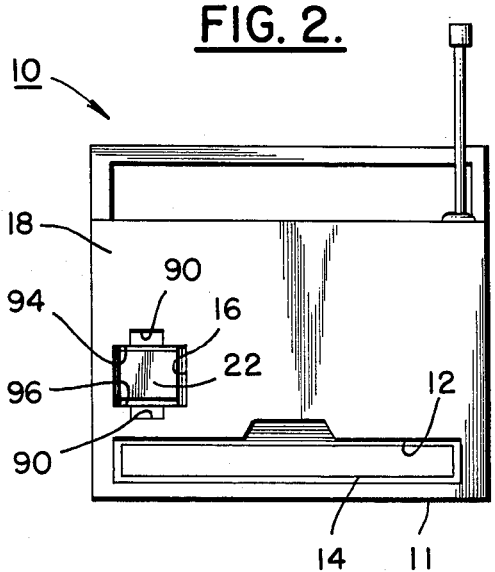
FIG. 2 is a rear elevation view of the radio of FIG. 1.

A portable radio 10 incorporating the present invention is illustrated by FIG. 1, the back side of the radio 10 being shown by FIG. 2. Although the invention is described herein with reference to the radio 10, it will be appreciated as this specification proceeds that the invention is equally applicable to a broad range of products adapted for operation from either internal batteries or 120 volt alternating current such as that typically available in the home. The invention is suitable for use in not only audio products such as tape recorders and compact stereo systems, but also a broad range of other products including portable computers, electronic games, etc.

The housing 11 of the radio 10 has, as shown by FIG. 2, a recess 12 therein for receiving batteries, the recess 12 being covered by a removable cover 14. The batteries received within the recess 12 comprise a first source of direct current power for energizing the radio 10. A second recess 16 is also provided in the back surface 18 of the radio housing 11 for receiving the power module 20 (FIG. 3) of this invention, the power module including a cover portion 22 that covers the recess 16 and forms a substantial continuation of the back surface 18 of the housing 11 when the power module is located within the recess as illustrated by FIG. 2.

Figure 3:
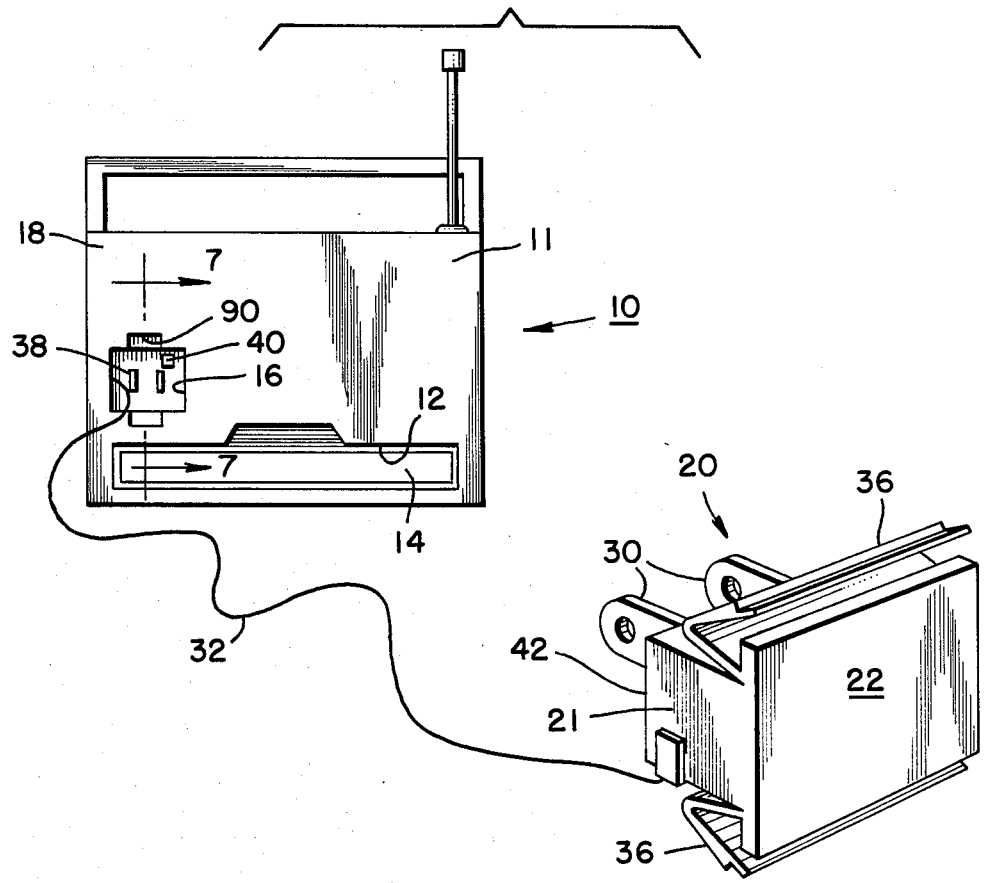
FIG. 3 is a view similar to FIG. 2 in which the power supply module and the attached low voltage electrical conductor are shown removed from their storage recess within the radio.

Referring now to FIG. 3, the power module 20 is shown removed from the recess 16, the power module 20 including a housing 21 having electrical contacts 30 projecting therefrom for selective insertion into a conventional outlet of 120 volt alternating current electric power. An electrical line cord 32 permanently interconnects the power module 20 and the radio 10, the line cord 32 is being connected to the radio 10 at a point within the recess 16. Because of the permanent connections, the line cord 32 cannot be lost or mislaid. The cord 32, which may conveniently be five to six feet in length, carries electric current having low voltage in the range of six to nine volts. Because of the low voltage, the cord 32 may be of extremely low bulk relative to conductors of similar length adapted to carry 120 volt alternating current. Consequently, the storage space required within the recess 16 for the cord 32 is much less than that which would be required for storage of a conventional line cord. This in turn permits a substantial reduction in the overall size of the radio housing 11. If desired, the line cord 32 could be made removable. In such event, the cord would be subject to risk of loss.

Figure 4:
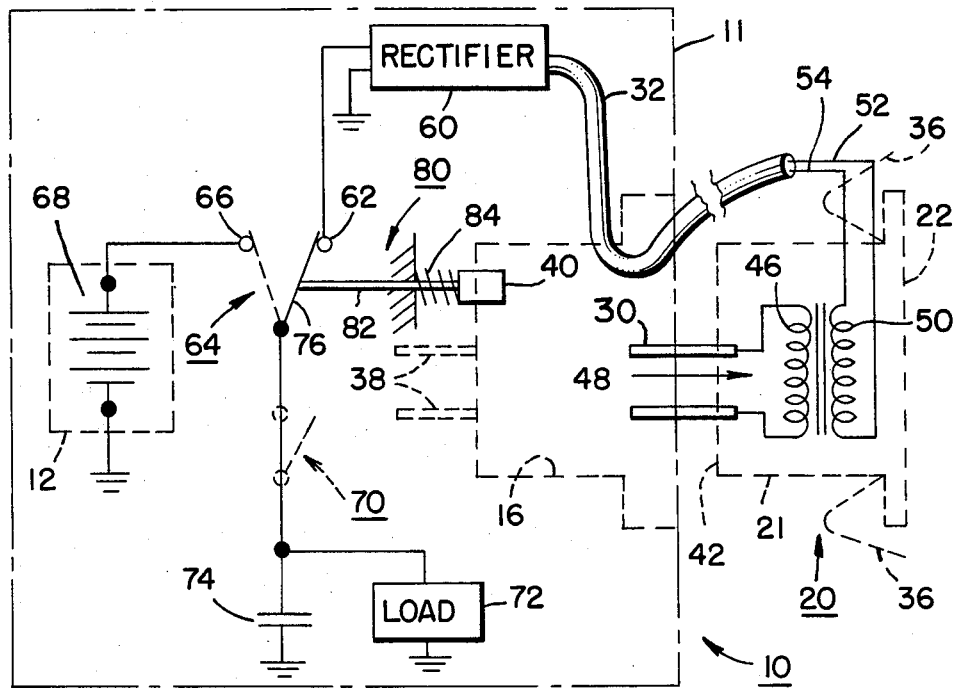
FIG. 4 is a schematic view of one form of the power supply circuitry of the invention, the rectifier for converting alternating current electric power to direct current electric power being located within the radio housing.

The power module has a pair of resilient latch elements 36 on opposite sides thereof for selectively latching the power module 20 within the recess 16. The structure and operation of the latch elements 36 will be described at a later point in this description. When it is desired to operate the radio 10 on alternating current house power, the latch elements 36 are disengaged from the radio housing 11, and the power module 20 is removed from the recess 16. The electrical contacts 30 may then be plugged into an electrical outlet to energize the radio. When it is desired to operate the radio 10 on battery power, the power module 20 is removed from the outlet, and the module 20 is inserted into the recess 16 with the electrical contacts 30 entering complementary slots 38 in the back wall of the recess 16 (FIGS. 3 and 4). As the contacts 30 enter the slots 38, a switch element 40 is depressed by the back surface 42 of the housing 21 of the power module 20 to switch the radio circuitry into its battery operating mode in a manner that is described hereinafter. When the power module 20 is removed from the recess 16, the switch element 40 is released, and the radio circuitry is conditioned to operate from electric power supplied through the line cord 32.

Referring now to FIG. 4, circuitry in accordance with one form of the invention is illustrated, the radio housing 11 and its recess 16 and the power module housing 21 being shown by broken lines to illustrate the locations of the various portions of the circuitry. The electrical contacts 30 are connected across the primary winding 46 of a transformer 48. The conductors 52 and 54 of the line cord 32 are connected across the low voltage secondary winding 50 of the transformer 48. As indicated previously, the cord 32 can be of extremely low bulk since all of the high voltage components are enclosed within the housing of the power module 20. A conventional rectifying network 60 is located within the radio housing 11 to convert the low voltage, alternating current supplied from the module 20 over the line cord 32 to the low voltage, direct current required for product operation. The output of the rectifier 60 is coupled to a first terminal 62 of a single pole, double throw switch 64. A second terminal 66 of the switch 64 is connected to batteries 68 received in the battery recess 12 in the radio housing 11. The switch 64 is connected through a manually operated ON-OFF switch 70 to a load 72, which in the illustrated embodiment of the invention comprises conventional radio circuitry. A filter capacitor 74 is provided across the load 72 to smooth out any variations in the level of the direct current supplied to the load 72.

The movable blade element 76 of the switch 64 is coupled to the switch element, or button, 40 by means of an appropriate linkage 80 including a connecting rod 82 and a compression spring 84. When the power module 20 is removed from the recess 16, the spring 84 biases both the button 40 and the switch blade 76 to the right into engagement with terminal 62 as viewed in solid lines by FIG. 4, conditioning the product for operation from a source of high voltage, alternating current electric power. If the contacts 30 are inserted into a source of power and the user moves the ON-OFF switch 70 to its ON, or closed, position as illustrated by solid lines, the radio circuitry 72 will be energized for radio operation. Operation will cease if the user moves the ON-OFF switch 70 to its OFF, or open, position (broken lines). When the power module 20 is inserted into the recess 16, its back surface 42 forces the button 40 and the switch blade 76 to the left against the force of the compression spring 84 into engagement with the terminal 66 as viewed in broken lines, conditioning the product for operation from the battery source 68. The user can then control radio operation by means of the ON-OF switch 70. Persons skilled in the art will readily appreciate that the linkage 80 as described herein may take on many forms in actual practice.

Figure 5:
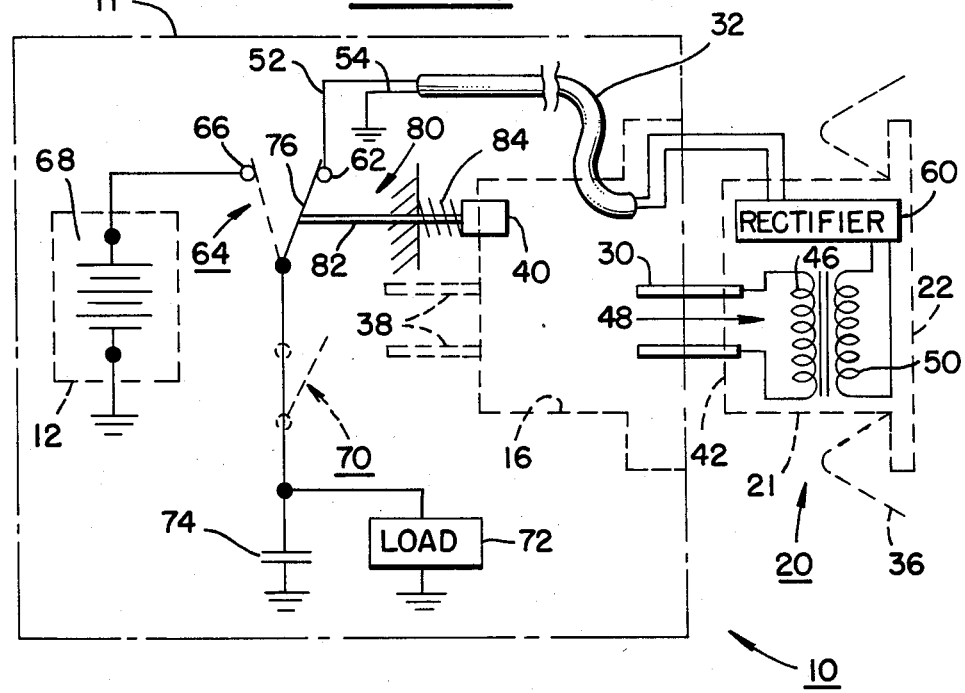
FIG. 5 is a view similar to FIG. 4 showing another form of the power supply circuitry, the rectifier being located within the power supply module housing.

The circuitry illustrated by FIG. 5 is identical to that of FIG. 4, except in that the rectifier 60 is located within the power module 20 instead of within the radio housing 11. Otherwise, the circuitry and operation of the radio are identical. While the inclusion of the recitifier 60 within the housing 21 of the power module 20 may require the housing 21 and the recess 18 to be somewhat larger than in the arrangement of FIG. 4, the space required within the radio housing 11 for the rectifier is eliminated, and the overall product size remains substantially unchanged.

The switching apparatus of FIGS. 4 and 5 has a first operative state in which only the batteries 68 are connected to the load 72 and a second operative state in which only the power module 20 is connected to the load 72. It will readily occur to those skilled in the art that the line conductor 52 could be permanently connected to the ON-OFF switch 70 and the switch 64 modified to merely open and close the circuit connecting the batteries 68 to the ON-OFF switch in response to actuation of the switch element 40. In such an arrangement, the switching apparatus has a first operative state in which both the power module 20 and the batteries 68 are connected to the load 72 and a second operative state in which only the power module is connected to the load 72.

Figure 6:
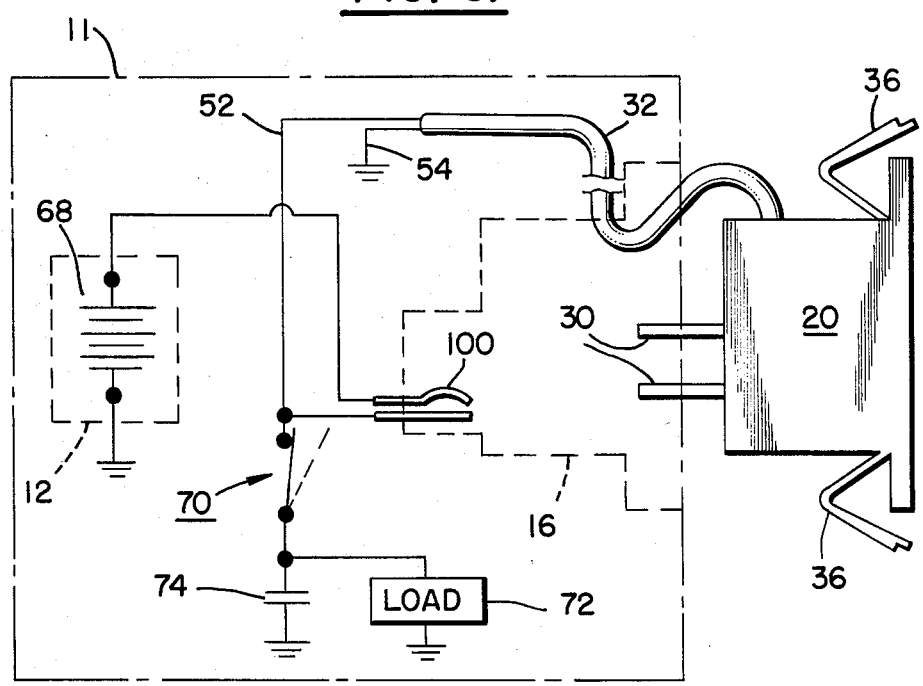
FIG. 6 is a view similar to FIG. 5 showing an alternative writing arrangement.

The switch 64 along with the button 40 and linkage 80 may be replaced, if desired, by the circuit elements illustrated by FIG. 6. In the arrangement of FIG. 6, the line conductor 52 is permanently connected to the ON-OFF switch 70, and the positive terminal of the batteries 68 is connected to a movable spring contact 100 which is normally spaced apart from a stationary mating contact 102. The contact 102 is permanently connected to the ON-OFF switch 70. When the electrical contacts 30 of the power module 20 are inserted into the modified recess 16, the lower contact 30, as shown by FIG. 6, engages the spring contact 100 and forces it downwardly into electrical contact with the lower contact 102 to permit energization of the load 72 from the batteries 68 through the ON-OFF switch 70. When the power module 20 is withdrawn from the recess 16, the contacts 100 and 102 separate, and the load may be energized from a source of alternating current power through the power module 20. The switching apparatus of the embodiment of FIG. 6 thus has a first operative state in which both the power module 20 and the batteries 68 are connected to the load 72 and a second operative state in which only the power module 20 is connected to the load 72.

Figure 7:
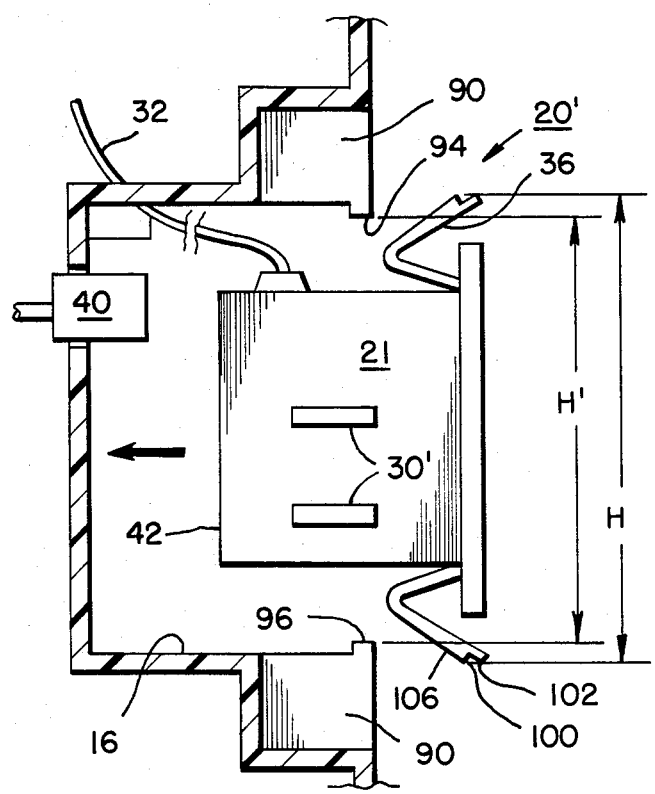
FIG. 7 is a view taken along viewing line 7—7 of FIG. 3 showing the power module in the process of being inserted into the storage recess.
Figure 8:
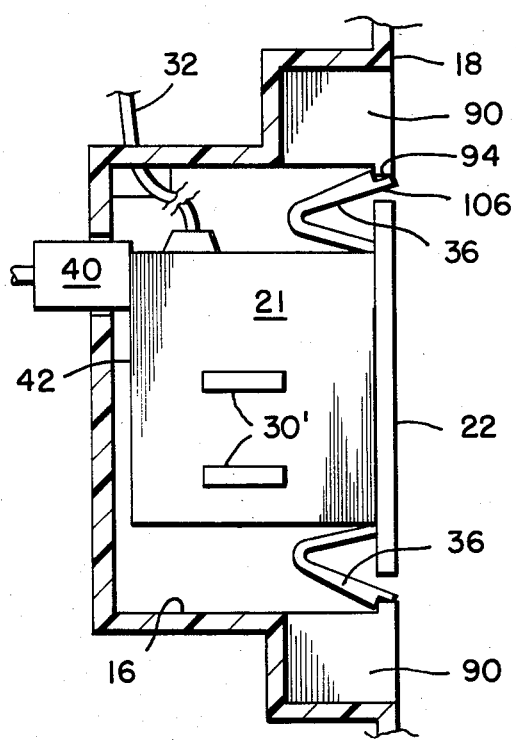
FIG. 8 is a view similar to FIG. 7 showing the power module latched into position within the recess.

Referring now to FIGS. 3, 7 and 8, the latching arrangement for the power module will be described. The power module 20' illustrated by FIGS. 7 and 8 is identical to the power module 20 of FIG. 3, except that the electrical contacts 30' extend out of the side of the module housing 21' rather than out of the back of the housing. In the form illustrated in FIGS. 7 and 8, there are no complementary slots in the recess 16' for receiving the contacts 30'. The recess 16 (and 16') has a pair of shallow cavities 90 at the upper and lower margins thereof, the cavities 90 being sized to permit the entry of the user's thumb and finger to release the power module 20 or 20' from the recess 16.

The latch elements 36 are formed of a resilient material such as acrylonitrile-butadiene-styrene (commonly known as ABS in the trade), the latch elements 36 having an unstressed state as illustrated by FIG. 7. In their unstressed state, the latch elements 36 have a total vertical height H that is greater than the vertical height H' between the upper and lower margins 94 and 96, respectively, of the recesses 16 and 16' on opposite sides of the centrally located cavities 90. The latch elements 36 terminate at their outer ends in first and second locking surfaces 100 and 102, respectively, and the latch elements 36 include inclined outer cam surfaces 106 thereon.

When the power module is moved into the recess in the direction indicated by the arrow in FIG. 7, the margins 94 and 96 of the recess engage the cam surfaces 106 of the latch elements 36 to bias the latch elements 36 inwardly toward the housing 21. As the power module 20' moves into the recess 16', its rear wall 42 engages the button 40 to depress the button 40 in the manner described previously. When the button 40 is substantially fully depressed, the locking surfaces 100 reach a point at which they are located behind the respective margins 94 and 96, and the latch elements 36 snap outwardly behind the respective margins as illustrated by FIG. 8 to latch the module 21 and the line cord 32 within the recess 16'. The locking surfaces 102 engage the facing edges of the margins 94 and 96, and the locking surfaces 102 are made long enough to assure that they maintain contact with the facing edges of the margins 94 and 96 when the power module 20' is pushed into the recess 16' to the fullest possible extent. This assures that the power module 20' will not rattle around in the recess 16' and that the cover surface 22 forms a substantial continuation of the back surface 18 of the radio housing 11. When it is desired to operate the radio 10 from a source of high voltage, alternating current, the user merely sticks his fingers into the cavities 90 and squeezes the latching elements 36 to an extent to cause the locking surfaces 100 to clear the facing edges of the margins 94 and 96. The power module 20' may then be removed from the recess 16' in a direction opposite to that indicated by the arrow in FIG. 7.

Persons skilled in the art will readily appreciate that the apparatus illustrated and described herein can take on various forms in practice. For example, many latching arrangements will be obvious to those skilled in the art. Furthermore, it will be obvious that the invention is not restricted to use with systems supplying conventional 120-volt electric power. The electrical contacts and other apparatus can be adapted to work with various sources of alternating current electric power, such as sources adapted for operation with electrical contacts having unique configurations.

From the foregoing, it will be seen that the present invention provides in a portable audio product or similar product an improved power supply means for supplying energy from either internal or external sources of electric power. The improved power supply of the invention may be totally received within the product in minimum space, and the power supply means is always available when needed for product operation.

While the invention has been particularly shown and described with reference to a preferred embodiment thereof, it will be understood as indicated above that various changes in form, details, and application may be made therein without departing from the spirit and scope of the invention. Accordingly, it is intended that all such modifications and changes be included within the spirit and scope of the appended claims.

What is claimed as new and is desired to secure by Letters Patent of the United States is:

1. In a product having a primary housing and an electrical load therein adapted for selective energization from first and second sources of direct current electric power, said first source comprising battery means received within said primary housing and said secondary source comprising means for converting relatively high voltage alternating current to relatively low voltage direct current, the improvement comprising:

a secondary housing containing at least all of the high voltage components of said second source including terminal means for connection to an external source of alternating current electric power, a recess within said primary housing accessible from the exterior of said primary housing, a relatively low bulk, low voltage electrical conductor interconnecting said secondary housing and said product through said recess for supplying low voltage electric power to said product from said secondary housing, said recess within said primary housing being configured and sized to receive both said secondary housing and said electrical conductor for storage therein when the product is not being energized from said second source, the low bulk of said low voltage electrical conductor permitting the size of said recess to be minimized, and latching means for releasably securing said secondary housing and said electrical conductor within said recess.

2. The product as defined by claim 1 in which said secondary housing includes external wall means adapted to form a substantial continuation of the outer surface of said primary housing when said secondary housing is secured within said recess.

3. The product as defined by claim 1 in which said electrical conductor is permanently attached to both said secondary housing and said product, whereby said electrical conductor cannot be lost or mislaid.

4. The product as defined by claim 1 in which said second source comprises:

a power transformer within said secondary housing having a primary winding connected to said terminal means and a secondary winding, and rectifying means within said primary housing coupled to said secondary winding and said electrical conductor for converting low voltage alternating current to low voltage direct current for energization of the product.

5. The product as defined by claim 4 in which said secondary housing includes external wall means adapted to form a substantial continuation of the outer surface of said primary housing when said secondary housing is secured within said recess.

6. The product is defined by claim 1 further comprising:

switching means having a first operative state for connecting said first source to the load for product energization therefrom and a second operative state for connecting said second source to the load for product energization therefrom, and switch actuating means at least partially carried by said secondary housing for switching said switching means to said first operative state when said secondary housing is secured within said recess and for switching said switching means to said second operative state when said secondary housing is removed from said recess.

7. The product as defined by claim 6 in which said switching means in said first operative state connects only said first source to the load and in said second operative state connects only said second source to the load.

8. The product as defined by claim 6 in which said switching means in said first operative state connects both said first and second sources to the load and in said second operative state connects only said second source to the load.

9. The product as defined by claim 6 in which said secondary housing includes external wall means adapted to form a substantial continuation of the outer surface of said primary housing when said secondary housing is secured within said recess.

10. The product as defined by claim 6 in which electrical conductor is permanently attached to both said secondary housing and said product, whereby said electrical conductor cannot be lost or mislaid.

11. The product as defined by claim 6 in which said second source comprises:

a power transformer within said secondary housing having a primary winding connected to said terminal means and a secondary winding, and rectifying means within said primary housing coupled to said secondary winding and said electrical conductor for converting low voltage alternating current to low voltage direct current for energization of the product.

12. The product as defined by claim 11 in which said secondary housing includes external wall means adapted to form a substantial continuation of the outer surface of said primary housing when said secondary housing is secured within said recess.

13. The product as defined by claim 12 in which said switching means in said first operative state connects only said first source to the load an in said second operative state connects only said second source to the load.

14. The product as defined by claim 12 in which said switching means in said first operative state connects both said first and second sources to the load and in said second operative state connects only said second source to the load.

* * * * *